(12) United States Patent
Matsumura et al.

(10) Patent No.: US 7,581,309 B2
(45) Date of Patent: Sep. 1, 2009

(54) METHOD OF ASSEMBLING A CARRIAGE ASSEMBLY

(75) Inventors: Takayoshi Matsumura, Kawasaki (JP); Naoki Ishikawa, Kawasaki (JP); Hiroshi Kobayashi, Kawasaki (JP); Yasuo Moriya, Kawasaki (JP); Hidehiko Kira, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 412 days.

(21) Appl. No.: 11/375,210

(22) Filed: Mar. 15, 2006

(65) Prior Publication Data

US 2007/0119045 A1 May 31, 2007

(30) Foreign Application Priority Data

Nov. 30, 2005 (JP) ............................ 2005-346331

(51) Int. Cl.
*G11B 5/48* (2006.01)
*B23P 11/00* (2006.01)

(52) U.S. Cl. .................. 29/603.03; 29/509; 29/520; 29/522.1; 360/266.1; 360/244.6

(58) Field of Classification Search .............. 29/603.03, 29/603.04, 821, 505, 509, 520, 522.1; 360/244.6, 360/266.1, 245.5, 244.8; 451/165; 72/39
See application file for complete search history.

(56) References Cited

U.S. PATENT DOCUMENTS 2,818,686 A * 1/1958 Weiss ...................... 451/165 X 6,035,681 A * 3/2000 Chung et al. ................ 72/39 X

FOREIGN PATENT DOCUMENTS

| JP | 06044703 A | * 2/1994 |
| JP | 7-304181 | 11/1995 |
| JP | 2004-127491 | 4/2004 |

OTHER PUBLICATIONS

Machine Language Translation of Japanese Patent Publication, JP 07-304181.*

* cited by examiner

*Primary Examiner*—A. Dexter Tugbang
(74) *Attorney, Agent, or Firm*—Kratz, Quintos & Hanson, LLP

(57) ABSTRACT

A method of assembling a carriage assembly is capable of suppressing deformation of spacer portions when suspensions are attached to carriage arms. The method of assembling a carriage assembly aligns fitting holes provided in front end portions of carriage arms and spacer holes provided in spacer portions of suspensions and places the suspensions onto the carriage arms, and then presses a ball with a diameter equal to or greater than an inner diameter of the spacer holes with a pressure-applying member to pass the ball through the spacer holes, thereby crimping spacer hole edge portions of the spacer portions and attaching the suspensions to the front end portions of the carriage arms. By applying ultrasonic vibration from two axial directions to the pressure-applying member, the pressure-applying member is caused to vibrate on a two-dimensional movement path on a predetermined plane and passes the ball through the spacer holes while causing the ball to rotate.

2 Claims, 4 Drawing Sheets

US 7,581,309 B2

METHOD OF ASSEMBLING A CARRIAGE ASSEMBLY

BACKGROUND OF THE INVENTION

1. Field of the Invention

The present invention relates to a method of assembling a carriage assembly for use in a magnetic disk apparatus where suspensions are attached to front end portions of carriage arms, and to an assembling apparatus that uses such method.

2. Related Art

FIG. 3 is a view showing the external appearance of a carriage assembly used in a magnetic disk apparatus. In FIG. 3, reference numeral 10 designates carriage arms and 12 one example of a suspension that is connected to front ends of the carriage arms 10. A magnetic head 14 is mounted on a front end portion of each suspension 12. Each magnetic head 14 is electrically connected via a flexible circuit board 16, which is attached to side surfaces of the carriage arms 10, to a control unit 18. Reference numeral 19 designates an actuator shaft that is fixed to a base portion of the carriage arms 10. The carriage arms 10 rotate about the axis of the actuator shaft 19 to carry out seek operations on flat planes that are parallel to the surfaces of recording media.

The carriage assembly is formed by fixing each suspension 12 by crimping to both surfaces of a front end portion of one out of the carriage arms 10 that are attached to the actuator shaft 19 so as to be parallel to one another.

A conventional method of fixing the suspensions 12 to the carriage arms 10 is disclosed by Patent Document 1. FIG. 5 shows the conventional method of fixing the suspensions 12 to the carriage arms 10 disclosed in Patent Document 1.

According to this conventional method, after the suspensions 12 have been aligned with and placed upon the front ends of the respective carriage arms 10, a metal ball 20 formed with a slightly larger diameter than an inner diameter of spacer holes 12b provided in the suspensions 12 is passed through the spacer holes 12b to fix the suspensions 12 to the carriage arms 10 by crimping. Reference numeral 22 designates a pressing shaft for pressing the metal ball 20 to cause the metal ball 20 to pass through the spacer holes 12b.

FIG. 4 shows an operation that passes the metal ball 20 through the spacer holes 12b of the suspensions 12 to fix the suspensions 12 to the carriage arms 10 by crimping. The suspensions 12 are placed on both surfaces of the respective carriage arms 10 with the fitting holes 10a and the spacer holes 12b in alignment. Since the metal ball 20 is formed with a slightly larger diameter than the spacer holes 12b, when the metal ball 20 is passed through the spacer holes 12b, the metal ball 20 acts so as to press open crimping portions 13 formed on inner circumferential edges of the spacer holes 12b, and as a result, the suspensions 12 are fixed so as to "bite into" the carriage arms 10. As shown in FIG. 4, during a single crimping operation, the metal ball 20 is caused by the pressing shaft 22 to move successively through the spacer holes 12b.

In this way, when assembling a carriage assembly, conventionally the metal ball 20 is used to press open the spacer holes 12b to fix the suspensions 12 to the carriage arms 10 by crimping. Accordingly, depending on the balance between the external diameter of the metal ball 20 and the internal diameter of the spacer holes 12b, a problem can occur where the spacer portions 12a deform due to stress that acts thereupon during crimping, resulting in the suspensions 12 becoming displaced from the standard positions. That is, when the suspensions 12 are fixed to the carriage arms 10 by crimping, the spacer portions 12a become bent, which can result in the suspensions 12 becoming tilted with respect to the standard angle. Tilting of the suspensions 12 affects the float heights of the magnetic heads 14 above the surfaces of the recording media, resulting in fluctuation in the float heights of the magnetic heads 14 above the surfaces of the recording media.

The storage capacity of modern magnetic disk apparatuses has been greatly increased, which has led to the float height of magnetic heads above the surfaces of recording media being kept low. This means that fluctuations in the float height of magnetic heads have a large effect on the information reading and writing characteristics, and therefore there are demands for the suppression of fluctuation in the float height of the magnetic heads to produce the required characteristics.

Patent Document 1 discloses a method of assembling a carriage assembly that can suppress deformation of the spacer portions 12a due to the stress applied during crimping. FIG. 6 is a diagram useful in explaining a method of assembling a carriage assembly using an ultrasonic horn 32 disclosed in Patent Document 1 as a method of assembling that can suppress deformation.

The method of assembling a carriage assembly disclosed in Patent Document 1 is characterized by using the ultrasonic horn 32 to pass the metal ball 20 through the spacer holes 12b. The metal ball 20 is the same as the metal ball 20 used in the method of assembling a carriage assembly described above. FIG. 6 shows a state of an assembly where gap maintaining plates 36 are inserted between adjacent carriage arms 10 and pressure applying plates 37a, 37b are placed in contact with both end surfaces of the carriage arms 10 so that the respective carriage arms 10 are supported by being sandwiched on both sides thereof.

The ultrasonic horn 32 applies ultrasonic vibration in the axial direction and due to the action of the ultrasonic horn 32, the metal ball 20 causes less damage to the spacer portions 12a during crimping, so that deformation is prevented when the suspensions 12 are attached to the carriage arms 10 and the suspensions 12 can be fixed to the carriage arms 10 more accurately. The reason for this is thought to be that the stress caused by the ultrasonic vibration of the ultrasonic horn 32 and the static stress due to the metal ball 20 pressing open the crimping portions 13 act so as to be superimposed, which makes it possible to reduce the resistance to deformation, and by reducing the average machining force by using a striking action that is repeated at high speed, it is possible to fix the members while suppressing deformation of the fixed portions of the suspensions 12 and the carriage arms 10.

Patent Document 1

Japanese Laid-Open Patent Publication No. 2004-127491 (see paragraphs 0003, 0004, 0015, 0023, and 0024 and FIGS. 3, 5, and 6).

However, with the above conventional method of assembling a carriage assembly that uses ultrasonic vibration, it is not possible to completely avoid deformation of the spacer portions 12a and therefore it is not possible to completely avoid fluctuations in the float amount of the magnetic head 14 from the surface of the recording medium due to displacement of the suspensions from the standard positions.

For this reason, there is much demand for a method of assembling a carriage assembly that can further reduce deformation in the spacer portions when suspensions are attached to carriage arms.

SUMMARY OF THE INVENTION

The present invention was conceived to solve the problem described above and it is an object of the present invention to provide a method of assembling a carriage assembly that compared to the conventional method can suppress deformation in spacer portions when suspensions are attached to carriage arms and can therefore further suppress fluctuation in the float height of magnetic heads from the surfaces of the recording media, and also an assembling apparatus that uses such method.

To solve the above problem, a method of assembling a carriage assembly according to the present invention aligns fitting holes provided in front end portions of carriage arms used in a magnetic disk apparatus and spacer holes provided in spacer portions of suspensions and places the suspensions onto the carriage arms, and then presses a ball with a diameter equal to or greater than an inner diameter of the spacer holes with a pressure-applying member to pass the ball through the spacer holes to crimp spacer hole edge portions of the spacer portions and attach the suspensions to the front end portions of the carriage arms, wherein by applying ultrasonic vibration from two axial directions to the pressure-applying member, the pressure applying member is caused to vibrate on a two dimensional movement path on a predetermined plane and passes the ball through the spacer holes while causing the ball to rotate.

By doing so, by applying ultrasonic vibration from two axial directions to the pressure applying member, the pressure applying member can be caused to move on a predetermined curved movement path on a predetermined plane. Accordingly, although the ball is pressed by a pressure applying member (ultrasonic horn) that vibrates only in the pressing direction (the axial direction of the spacer holes) in the conventional art and therefore the ball hardly rotates, with the invention of Claim 1, since the pressure applying member that applies pressure to the ball contacts the ball while tracing a two dimensional movement path, the ball can be passed through the spacer holes while rotating. The present inventors discovered that by doing so, excessive force is not applied to the spacer portions when the ball passes through the spacer holes, and therefore there is reduced deformation in the spacer portions.

In addition, by applying ultrasonic vibration with frequencies that are integer multiples of a predetermined frequency to the pressure-applying member from the two axial directions, the ball may be caused to pass through the spacer holes while rotating in a predetermined direction.

By doing so, the direction of movement of the pressure applying member at the instant when the pressure-applying member contacts the ball is set at a predetermined direction, and therefore the ball can be passed through the spacer holes while rotating in a predetermined direction. The present inventors discovered that by doing so, it is possible to further avoid having an excessive force applied to the spacer portions when the ball passes through the spacer holes and therefore deformation of the spacer portions is reduced.

In addition, the movement path of the pressure-applying member due to the ultrasonic vibration may be one of a circle and an oval.

By doing so, it is possible to use a simple construction that sets the frequencies of the ultrasonic vibration applied from the two axial directions equally.

Also, ultrasonic vibration may be applied to the pressure-applying member from two axial directions that are a pressing direction for the ball and a direction perpendicular to the pressing direction to cause the pressure-applying member to vibrate with a movement path on a plane parallel to the pressing direction and cause the ball to rotate about a rotational axis that is substantially perpendicular to the pressing direction.

By doing so, it is possible to cause the ball to rotate about a rotational axis that is substantially perpendicular to the pressing direction. The present inventors discovered that by doing so, it is possible to further avoid having an excessive force applied to the spacer portions when the ball passes through the spacer holes and therefore deformation of the spacer portions is reduced.

To solve the above problem, an assembling apparatus for a carriage assembly according to the present invention aligns fitting holes provided in front end portions of carriage arms used in a magnetic disk apparatus and spacer holes provided in spacer portions of suspensions and places the suspensions onto the carriage arms, and then passes a ball with a diameter equal to or greater than an inner diameter of the spacer holes through the spacer holes to crimp spacer hole edge portions of the spacer portions and attach the suspensions to the front end portions of the carriage arms, the assembling apparatus including: a pressure-applying member; a driving device that moves the pressure-applying member so that the pressure-applying member presses the ball to pass the ball through the spacer holes; and ultrasonic vibrating means that causes the pressure-applying member to vibrate on a two dimensional movement path on a predetermined plane by applying ultrasonic vibration to the pressure-applying member from two axial directions to cause the ball that passes through the spacer holes to rotate.

With the above construction, by applying ultrasonic vibration from two axial directions to the pressure-applying member, the pressure-applying member can be caused to move on a predetermined curved movement path on a predetermined plane. Accordingly, although the ball is pressed by a pressure-applying member (ultrasonic horn) that vibrates only in the pressing direction (the axial direction of the spacer holes) in the conventional art and therefore the ball hardly rotates, with the invention of claim 5, since the pressure-applying member that applies pressure to the ball contacts the ball while tracing a two dimensional movement path, the ball can be passed through the spacer holes while rotating. The present inventors discovered that by doing so, excessive force is not applied to the spacer portions when the ball passes through the spacer holes, and therefore there is reduced deformation in the spacer portions.

In addition, the ultrasonic vibrating means may apply ultrasonic vibration with frequencies that are integer multiples of a predetermined frequency to the pressure-applying member from two axial directions to cause the ball to pass through the spacer holes while rotating in a predetermined direction.

By doing so, the direction of movement of the pressure-applying member at the instant when the pressure-applying member contacts the ball is set at a predetermined direction, and therefore the ball can be passed through the spacer holes while rotating in a predetermined direction. The present inventors discovered that by doing so, it is possible to further avoid having an excessive force applied to the spacer portions when the ball passes through the spacer holes and therefore deformation of the spacer portions is reduced.

In addition, the movement path of the pressure-applying member due to the ultrasonic vibration produced by the ultrasonic vibrating means may be one of a circle and an oval.

By doing so, it is possible to use a simple construction that sets the frequencies of the ultrasonic vibration applied from the two axial directions equally.

The ultrasonic vibrating means may apply ultrasonic vibration to the pressure-applying member from two axial directions that are a pressing direction for the ball and a direction perpendicular to the pressing direction to cause the pressure-applying member to vibrate with a movement path on a plane parallel to the pressing direction and cause the ball to rotate about a rotational axis that is substantially perpendicular to the pressing direction.

By doing so, it is possible to cause the ball to rotate about a rotational axis that is substantially perpendicular to the pressing direction. The present inventors discovered that by doing so, it is possible to further avoid having an excessive force applied to the spacer portions when the ball passes through the spacer holes and therefore deformation of the spacer portions is reduced.

With the method of assembling a cartridge assembly and assembling apparatus according to the present invention, it is possible to suppress deformation in the spacer portions of suspensions and therefore keep the spacer portions flat, which makes it possible to attach suspensions to the carriage arms without tilting and with higher accuracy than the conventional art. By doing so, it is possible to suppress fluctuations in the float characteristics of magnetic heads and therefore it is possible to assemble a carriage assembly with favorable information read/write characteristics.

BRIEF DESCRIPTION OF THE DRAWINGS

The aforementioned and other objects and advantages of the present invention will become apparent to those skilled in the art upon reading an understanding the following detailed description with reference to the accompanying drawings.

In the drawings.

DESCRIPTION OF THE PREFERRED EMBODIMENTS

Figure 3:
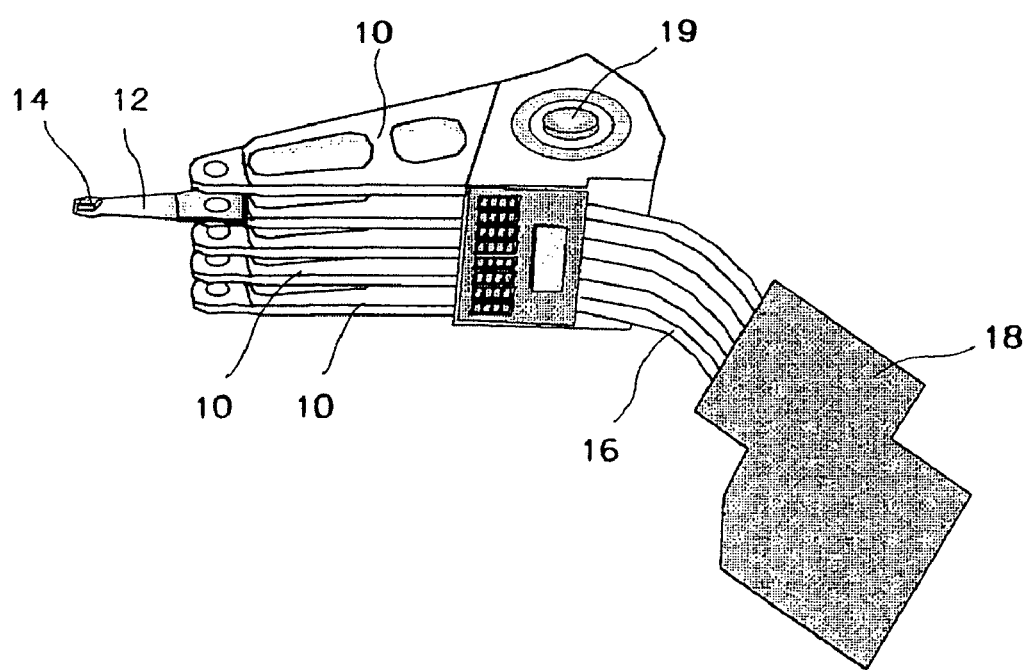
FIG. 3 is a view showing the appearance of a carriage assembly.

The carriage assembly to be assembled by the method of assembling a carriage assembly and assembling apparatus according to an embodiment of the present invention is shown in FIG. 3. The overall construction of the carriage assembly shown in FIG. 3 has been described for the conventional art, and therefore description thereof is omitted here.

Figure 1:
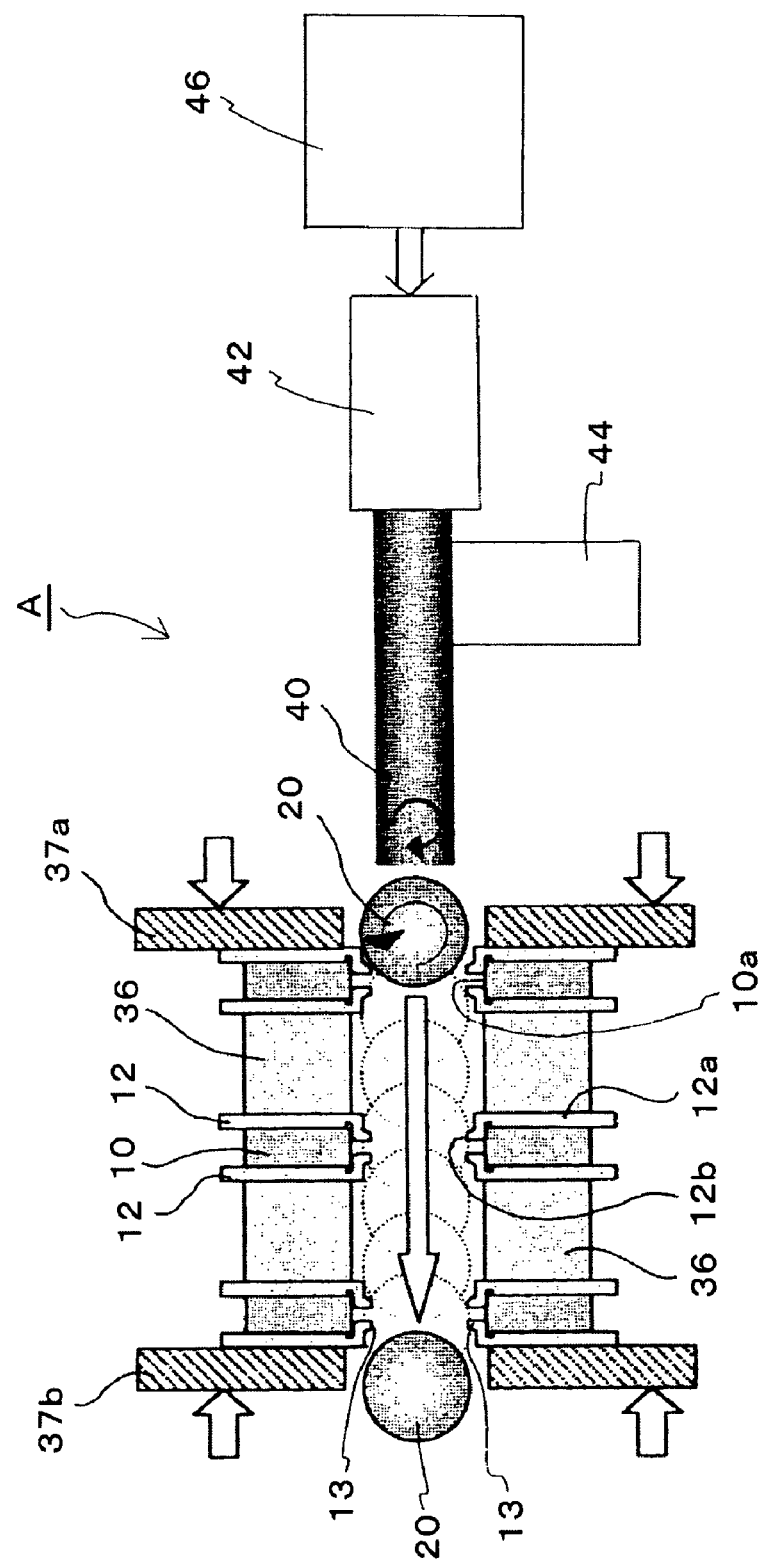
FIG. 1 is a diagram useful in explaining a method of assembling a carriage assembly and an assembling apparatus according to the present invention.

FIG. 1 is a diagram useful in explaining the method of assembling a carriage assembly and assembling apparatus according to the present embodiment. In FIG. 1, the carriage arms 10 and the suspensions 12 have the same forms as in the conventional art described earlier. That is, the fitting holes 10a are provided in the front ends of the carriage arms 10 and the spacer holes 12b to be fitted into the fitting holes 10a are provided in the spacer portions 12a provided at the base portions of the suspensions 12.

The assembling apparatus A for a carriage assembly that uses the method of assembling a carriage assembly according to the present embodiment includes an ultrasonic horn 40, a first ultrasonic vibrating device 42 and a second ultrasonic vibrating device 44 as ultrasonic vibrating means that apply ultrasonic vibration to the ultrasonic horn 40, and a driving device 46 capable of moving and controlling the ultrasonic horn 40 so that the ultrasonic horn 40 presses the metal ball 20 to pass the metal ball 20 through . the spacer holes 12b.

The ultrasonic horn 40 is cylindrical in form and is provided so as to be capable of being coaxially inserted through the spacer holes 12b, can transmit ultrasonic vibration produced by the first and second ultrasonic vibrating devices 42, 44 and functions as a pressure-applying member that presses the metal ball 20 to pass the metal ball 20 through the spacer holes 12b.

It should be noted that the metal ball 20 is formed with a slightly larger diameter than the inner diameter of the spacer holes 12b.

The first ultrasonic vibrating device 42 applies ultrasonic vibration to the ultrasonic horn 40 in the pressing direction of the metal ball 20 (that is, the axial direction of the spacer holes 12b). The second ultrasonic vibrating device 44 applies ultrasonic vibration to the ultrasonic horn 40 in a direction perpendicular to the pressing direction.

That is, ultrasonic vibration is applied to the ultrasonic horn 40 by the first ultrasonic vibrating device 42 and the second ultrasonic vibrating device 44 in two directions that are the pressing direction and the direction perpendicular to the pressing direction. By doing so, the ultrasonic horn 40 is caused to vibrate on a movement path on a plane that is parallel to the pressing direction.

Figure 2:
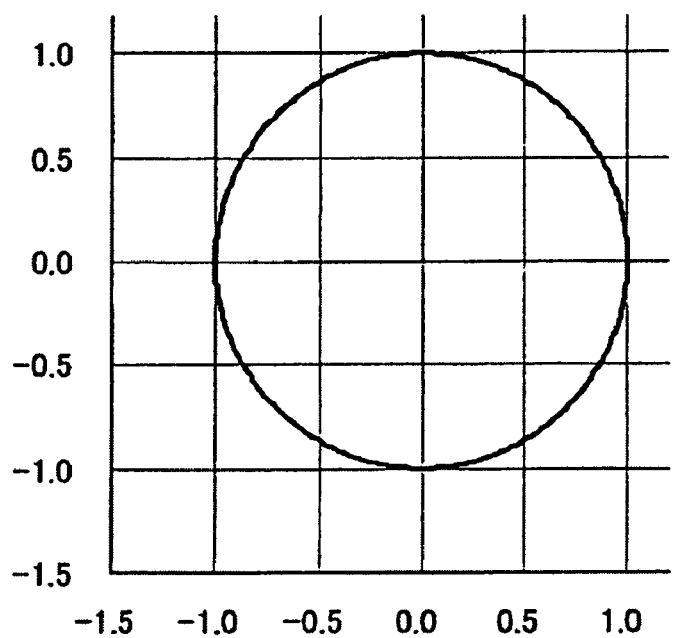
FIG. 2 is a graph showing one example of a movement path of an ultrasonic horn (pressure-applying member)

FIG. 2 shows an example of the movement path of the ultrasonic horn 40. In FIG. 2, the horizontal axis (X axis) shows the displacement of the ultrasonic horn 40 in the pressing direction and the vertical axis (Y axis) shows the displacement of the ultrasonic horn 40 in the direction perpendicular to the pressing direction (i.e., the up down direction in FIG. 1). That is, the amplitude of the ultrasonic horn 40 due to the first ultrasonic vibrating device 42 is expressed by the horizontal axis (X axis) in FIG. 2 and the amplitude due to the second ultrasonic vibrating device 44 is expressed by the vertical axis (Y axis).

In the example shown in FIG. 2, when the ranges of the displacements of the ultrasonic vibration due to the first ultrasonic vibrating device 42 and the second ultrasonic vibrating device 44 are expressed as −1 to 1 (i.e., the respective amplitudes are 2), the displacements in the X axis and the Y axis of the ultrasonic horn 40 are expressed by the equations $X = \sin(2\pi ft)$, $Y = \cos(2\pi ft)$ (where f is the frequency (in Hz) of the ultrasonic vibration and t is elapsed time (in seconds)).

By doing so, as shown by the arrow in FIG. 1 and by FIG. 2, the ultrasonic horn 40 is caused to vibrate on a circular movement path on a plane that is parallel to the pressing direction.

Next, the method of assembling a carriage assembly according to the present embodiment that uses the assembling apparatus A for a carriage assembly will be described.

FIG. 1 shows an operation where the assembling apparatus A for a carriage assembly is used to pass the metal ball 20 through the spacer holes 12b, of the suspensions 12 to crimp and fix the suspensions 12 to the carriage arms 10.

As shown in FIG. 1, in the method of assembling a carriage assembly according to the present embodiment, the suspensions 12 are placed on both surfaces of the respective carriage arms 10 so that the spacer holes 12b, and the fitting holes 10a are aligned. In addition, gap maintaining plates 36 are inserted between adjacent carriage arms 10 and pressure-applying plates 37a, 37b are placed in contact with both end surfaces of the carriage arms 10 so that the carriage arms 10 are sandwiched from both sides.

In this state, the assembling apparatus A for a carriage assembly is used to pass the metal ball 20 through the spacer holes 12b. That is, first the metal ball 20 is aligned with the spacer holes 12b, and the ultrasonic horn 40 is moved by the driving device 46 so as to contact the metal ball 20 and to press in the metal ball 20 so that the metal ball 20 is passed through the spacer holes 12b. When doing so, the first and second ultrasonic vibrating devices 42, 44 are driven to apply ultrasonic vibration to the ultrasonic horn 40 from the two axial directions mentioned above.

Figure 4:
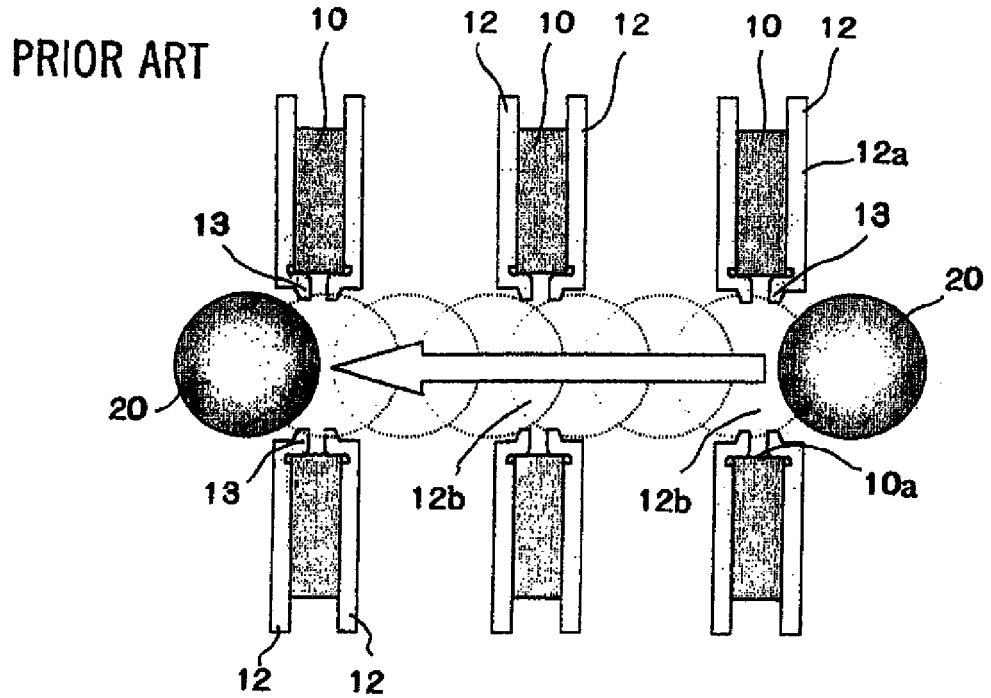
FIG. 4 is a diagram useful in explaining the action that crimps and fixes suspensions to carriage arms by passing a metal ball (ball) through spacer holes of the suspensions.
Figure 5:
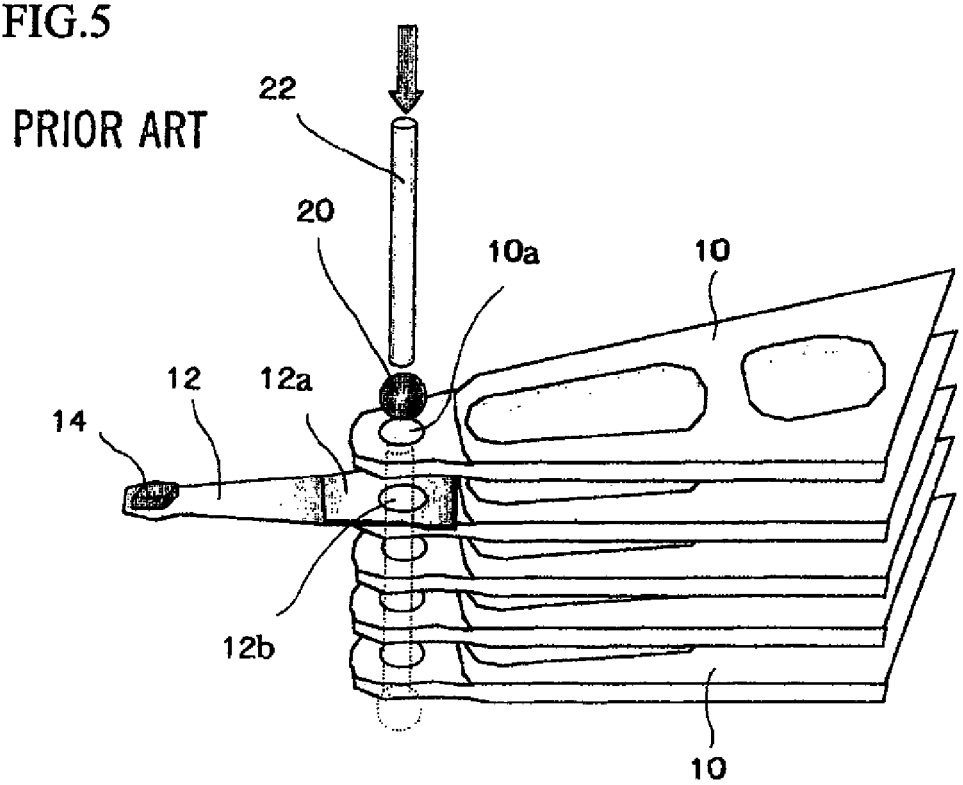
FIG. 5 is a diagram useful in explaining a conventional method of assembling a carriage assembly.
Figure 6:
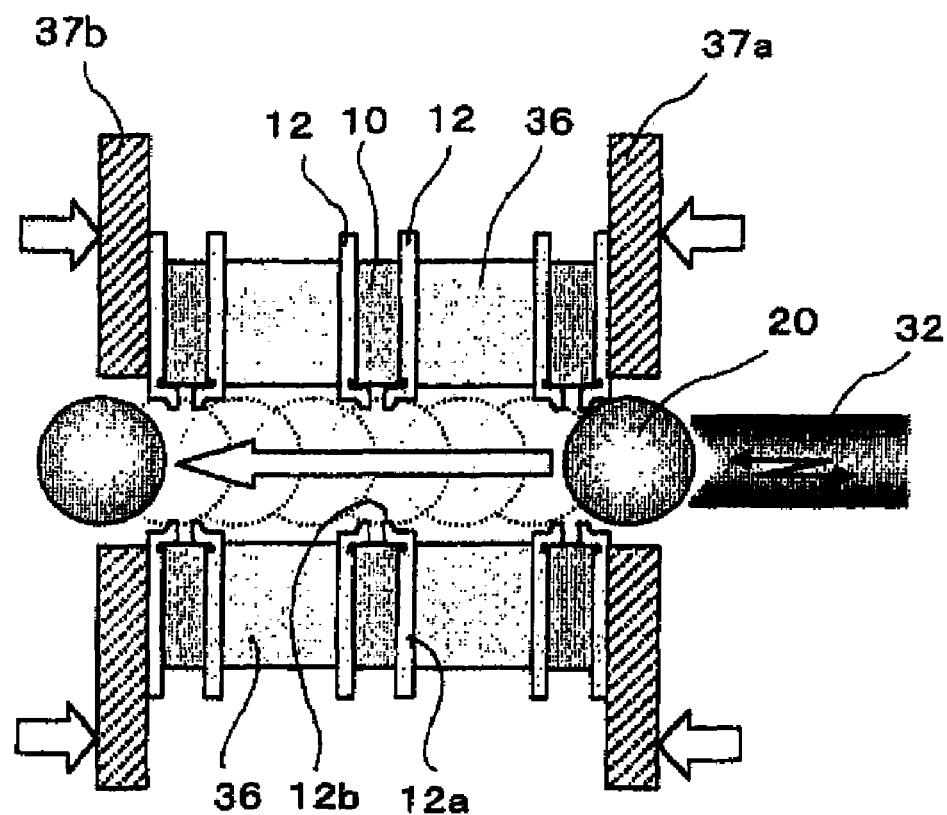
FIG. 6 is a diagram useful in explaining a conventional method of assembling a carriage assembly.

Since the metal ball 20 is formed with a slightly larger diameter than the spacer holes 12b, when the metal ball 20 passes through the spacer holes 12b, the metal ball 20 acts so as to press open the crimping portions 13 formed at the inner circumferential edges of the spacer holes 12b, and as a result, the suspensions 12 are fixed so as to bite into the carriage arms 10. As shown in FIGS. 1 and 4, the metal ball 20 is caused by the ultrasonic horn 40 to move through the successive spacer holes 12b, from one side of the carriage arms 10 to the other in a single crimping operation.

When doing so, as described above, the ultrasonic horn 40 is caused to vibrate on a circular movement path on a plane that is parallel to the pressing direction. As a result, the ultrasonic horn 40 moves toward and away from the metal ball 20 and since the ultrasonic horn 40 moves in a predetermined direction at the instant when the ultrasonic horn 40 contacts the metal ball 20 (upward in FIG. 1), the metal ball 20 is caused to rotate in a predetermined direction about a rotational axis that is substantially perpendicular to the pressing direction (in FIG. 1, the metal ball 20 is caused to rotate counterclockwise as shown by the arrow).

In the conventional method of assembling a carriage assembly, the metal ball is pressed by a pressure-applying member (ultrasonic horn) that vibrates only in the pressing direction (the axial direction of the spacer holes), and therefore the metal ball hardly rotates. However, in the method of assembling a carriage assembly according to the present embodiment, the pressure-applying member (the ultrasonic horn 40) that presses the metal ball 20 contacts the metal ball 20 while tracing a two dimensional movement path, and therefore it is possible to cause the metal ball 20 to pass through the spacer holes 12b, while rotating.

The present inventors found that by doing so, excessive force is not applied to the spacer portions 12a when the metal ball 20 passes through the spacer holes 12b, and therefore there is reduced deformation in the spacer portions 12a.

Note that the present inventors suppose that the reason for this is that while static friction is produced between the metal ball 20 and the crimping portions 13 with the conventional method, with the method according to the present embodiment, a dynamic friction that is smaller than the static friction acts between the metal ball 20 and the crimping portions 13 due to the metal ball 20 rotating.

With the method of assembling a carriage assembly and the assembling apparatus according to the present embodiment, since deformation of the spacer portions 12a of the suspensions 12 is suppressed and the spacer portions 12a are kept flat, the suspensions 12 can be attached to the carriage arms 10 without tilting and with higher accuracy than the conventional art. By doing so, it is possible to suppress fluctuations in the float characteristics of the magnetic heads and therefore it is possible to assemble a carriage assembly with favorable information read/write characteristics.

In particular, by applying ultrasonic vibration of frequencies that are different integer multiples of a predetermined frequency from the two axial directions, the direction of movement of the ultrasonic horn 40 at the instant when the ultrasonic horn 40 contacts the metal ball 20 can be set at a predetermined direction, and therefore the metal ball 20 can be caused to rotate in a "predetermined direction" (that is, a predetermined direction of rotation).

The present inventors discovered that by passing the metal ball 20 through the spacer holes 12b, while causing the metal ball 20 to rotate in a predetermined direction, it is possible to avoid having an excessive force applied to the spacer portions 12a when the metal ball 20 passes through the spacer holes 12b, and therefore deformation of the spacer portions 12a is reduced.

It should be noted that in the present embodiment, as should be clear from the f value being the same in the equations expressing the displacements of the ultrasonic horn 40 in the two axial directions, the frequencies of the ultrasonic vibration applied from the two axial directions are equal. However, the present invention is not limited to this and may be constructed so that the ultrasonic vibration is applied in the two axial directions with frequencies that are different integer multiples of a predetermined frequency. For example, the frequency F of the ultrasonic vibration applied in the Y axis direction may be set at double the frequency f of the ultrasonic vibration applied in the X axis direction (i.e., F=2f) and the displacement due to the respective ultrasonic vibrations may be set so as to be expressed by the equations $X=\sin(2\pi ft)$ and $Y=\cos(2\pi Ft)$. By doing so, since it is possible to set the direction of movement of the ultrasonic horn 40 at a predetermined direction when the ultrasonic horn 40 contacts the metal ball 20, it is possible to cause the metal ball 20 to rotate in a "predetermined direction" (that is, a predetermined direction of rotation).

It is also possible to set the amplitude of the ultrasonic vibration in the X axis direction and the amplitude of the ultrasonic vibration in the Y axis direction differently, that is, to set the respective equations at $X=A \cdot \sin(2\pi ft)$ and $Y=B \cdot \cos(2\pi ft)$ (where the values A and B are constants such that $A \neq B$) for example, so that the movement path of the ultrasonic horn 40 becomes oval.

Also, although the present embodiment is constructed so that ultrasonic vibration is applied to the ultrasonic horn 40 from two axial directions that are the pressing direction for the metal ball 20 and a direction perpendicular to the pressing direction, the two axial directions for the present invention are not limited to such. For example, if the two axial directions are set as directions that are both perpendicular to the pressing direction and are perpendicular to each other, it is possible to cause the ultrasonic horn 40 to move on a movement path on a plane perpendicular to the pressing direction and to cause the metal ball 20 to rotate about a rotational axis that is parallel to the pressing direction.

What is claimed is:

1. A method of assembling a carriage assembly that aligns fitting holes provided in front end portions of carriage arms used in a magnetic disk apparatus and spacer holes provided in spacer portions of suspensions and places the suspensions onto the carriage arms, and then presses a ball with a diameter equal to, or greater than, an inner diameter of the spacer holes with a pressure-applying member to pass the ball through the spacer holes to crimp spacer hole edge portions of the spacer portions and attach the suspensions to the front end portions of the carriage arms, wherein by applying ultrasonic vibration from two axial directions to the pressure-applying member, the pressure-applying member is caused to vibrate on a two-dimensional movement path on a predetermined plane and passes the ball through the spacer holes while causing the ball to rotate, wherein by applying ultrasonic vibration with frequencies that are integer multiples of a predetermined frequency to the pressure-applying member from the two axial directions, the ball is caused to pass through the spacer holes while rotating in a predetermined direction, and wherein the movement path of the pressure-applying member due to the ultrasonic vibration is one of a circle and an oval.

2. A method of assembling a carriage assembly according to claim 1, wherein the ultrasonic vibration is applied to the pressure-applying member from two axial directions that comprise a pressing direction for the ball and a direction perpendicular to the pressing direction, to cause the pressure-applying member to vibrate with the two-dimensional movement path on a plane parallel to the pressing direction and cause the ball to rotate about a rotational axis that is substantially perpendicular to the pressing direction.

* * * * *